United States Patent [19]
Coffey

[11] 4,243,838
[45] Jan. 6, 1981

[54] STIFFNESS VARIATION DEVICE

[76] Inventor: Dennis K. Coffey, 2220-½ Elba St., Durham, N.C. 27705

[21] Appl. No.: 936,282

[22] Filed: Aug. 23, 1978

Related U.S. Application Data

[63] Continuation of Ser. No. 818,094, Jul. 22, 1977, abandoned.

[51] Int. Cl.[3] .......... H04M 1/00; H04R 9/00
[52] U.S. Cl. .......... 179/1 F; 179/115.5 VC
[58] Field of Search ...... 179/1 F, 115.5 R, 115.5 VC, 179/115.5 DV; 335/219, 222, 223, 231, 269; 361/146

[56] References Cited

U.S. PATENT DOCUMENTS

| | | | |
|---|---|---|---|
| 3,014,096 | 12/1961 | Clements | 179/1 F |
| 3,436,494 | 4/1969 | Bozak | 181/171 |
| 3,683,130 | 8/1972 | Kahn | 179/1 P |

FOREIGN PATENT DOCUMENTS

| | | | |
|---|---|---|---|
| 864516 | 4/1941 | France | 179/115.5 R |

*Primary Examiner*—Vincent P. Canney

[57] ABSTRACT

This invention relates to an electromechanical apparatus for varying stiffness and is especially useful in electrodynamic systems, such as electrodynamic loudspeakers, to improve their low frequency response.

17 Claims, 5 Drawing Figures

STIFFNESS VARIATION DEVICE

Figure 1:
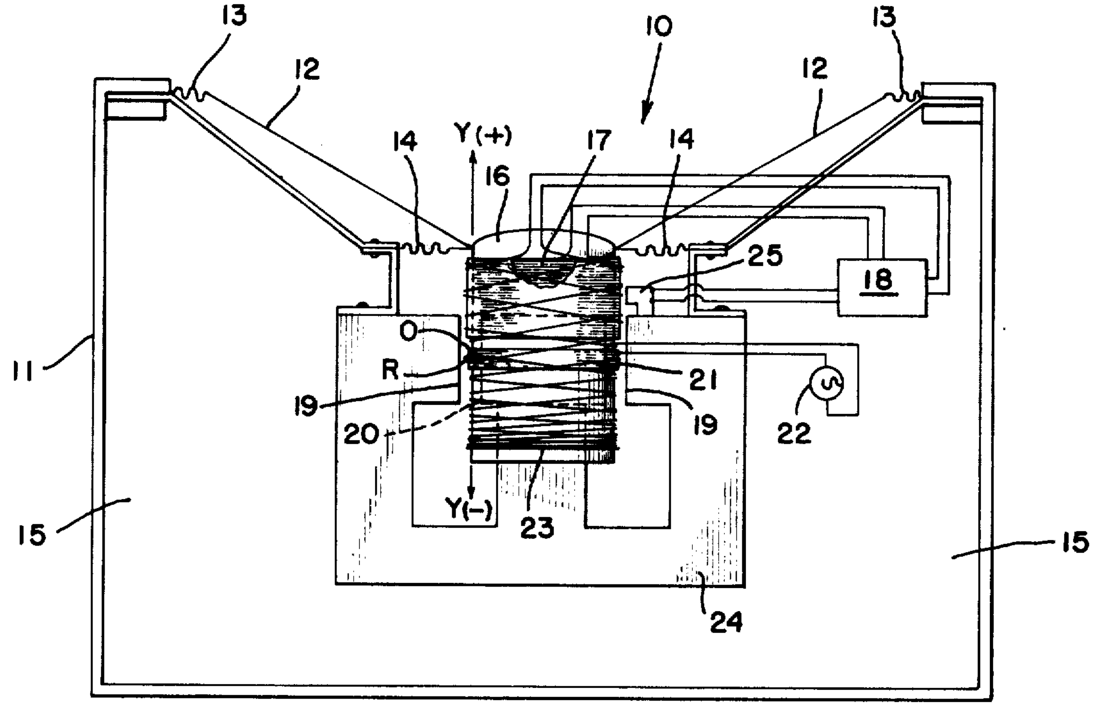

This is a continuation of application Ser. No. 818,094 filed July 22, 1977 now abandoned.

BACKGROUND AND OBJECTIVES OF THE INVENTION

As known heretofore, various structures and mechanisms display a resistance and resiliency to displacement or deformation. For example, the coil spring resists being stretched and upon release quickly returns to its original configuration. The relationship of the return force exerted by the spring to the displacement of the spring from its equilibrium position is known as the "stiffness" of the spring. The stiffness force exerted by the spring varies according to the displacement and is shown by the equation: $F=kx$; in which k is the stiffness of the spring and is a constant if the stiffness is linear, x is the displacement and F is the spring force or stiffness force.

For a simple mechanical system involving a coil spring having one end affixed to a stationary member and the opposite end connected to a displaceable mass m, the following formula is applicable:

$$f_n = \frac{1}{2\pi}\sqrt{\frac{k}{m}}$$

where:

k = stiffness of the spring m = mass $f_n$ = resonant frequency

In the above mechanical system the stiffness force increases as the spring is moved to an extended posture from equilibrium. In the above formula the resonant frequency decreases as the stiffness value k is made to decrease.

To reduce the stiffness in a mechanical device such as a coil spring, mechanical force producing devices have been devised to provide a "negative stiffness", a term used to indicate that the force supplied is in a direction opposite to that of the normal stiffness force of the spring.

However, most such mechanical devices have numerous shortcomings and are difficult to construct, adjust, and incorporate for their beneficial features. Also, such mechanical devices have nonlinearity problems and oftentimes require relatively large areas for their application. Additionally, mechanical force producing devices can only correct the most simple stiffness problems and are therefore limited in their use.

Therefore, it is one of the objectives of this invention to provide an apparatus for reducing stiffness which is simple to construct and not overly expensive.

It is another objective of the present invention to provide an apparatus to reduce the stiffness in a mechanical system using electrodynamic means.

It is yet another objective of the present invention to provide an apparatus to reduce stiffness which is easy to adjust.

It is still another objective of the present invention to provide an electromechanical force-vs-displacement apparatus which will allow the user to achieve any desired force-vs-displacement curve, linear or nonlinear, over the entire operating range of displacement; including variation of a nonlinear stiffness to achieve a desired linear stiffness; and including creation of a totally negative stiffness device.

SUMMARY OF THE INVENTION AND DESCRIPTION OF THE DRAWINGS

Various forms of this invention define an electromechanical device to reduce stiffness forces encountered as for example in loudspeakers. Other examples of the invention can be used as negative stiffness devices or stiffness linearizing devices. In a typical stiffness reducing configuration, a displaceable member is positioned so that it is cut radially by magnetic flux lines of an electromagnet. On one portion of the displaceable conducting member are current carrying windings. As direct current is passed through these windings a force is produced which causes the displaceable member to tend to move in an axial direction. This force increases as the windings move in that direction as will be described below. (Directional force as used herein also refers to any component of the force in substantially the same direction.) Also positioned on the displaceable member is a second set of windings for carrying direct current and for producing a force in the opposite axial direction to that of the force produced by the current carried in the first set of windings.

By varying according to position of the displaceable conducting member either the magnetic flux density, the length of the windings cut by the magnetic flux, the amperage of the current, or the direction of the current in one or both sets of windings, or combinations of these, a net force can be applied to the displaceable member which is zero at some equilibrium position and which increases with displacement away from and is directed away from this equilibrium position. The effective stiffness of mechanical stiffness members properly attached to the displaceable member will thereby be reduced.

In the event mechanical stiffness members are utilized, for example as are used in loudspeakers, the opposition force produced by the second set of windings on the displaceable member can be replaced by the stiffness of the mechanical stiffness member.

Various embodiments of this invention may be devised including utilizing a singular coil on a displaceable member wherein amperage of the current and consequently strength of the force is made dependent on position of the coil and wherein the direction of the force produced can be reversed by reversing the direction of the current through the single coil, so that force is in one direction at some coil positions and in the other direction at other coil positions.

Figure 3:
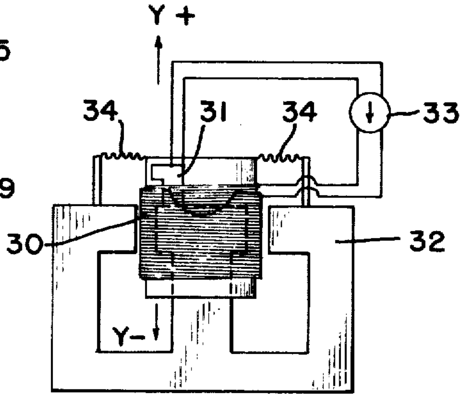
Figure 2:
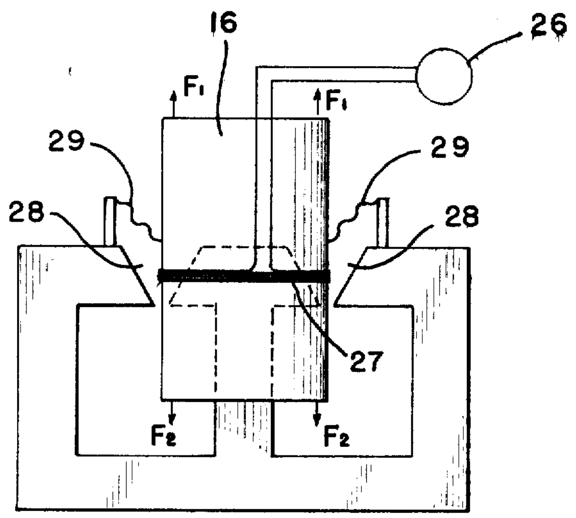

A few simple, illustrative embodiments which lay out principles of the invention are shown in FIGS. 1, 2, and 3. More complex embodiments may exhibit combinations of the principles incorporated in these examples.

Figure 4:
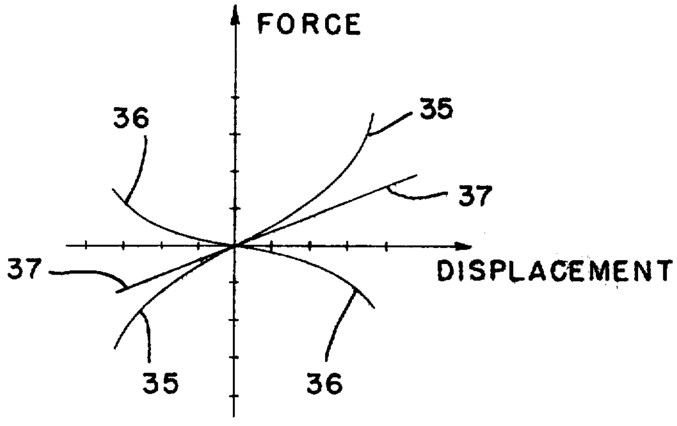

In FIG. 1, a preferred embodiment of the invention is shown as being employed in a loudspeaker;

FIG. 2 shows an embodiment of the invention utilizing a magnet structure having non-parallel pole faces to form an air gap having a wedge shaped cross-section;

FIG. 3 demonstrates yet another embodiment of the invention utilizing a single winding;

FIG. 4 demonstrates a linearizing application of the invention; and

Figure 5:
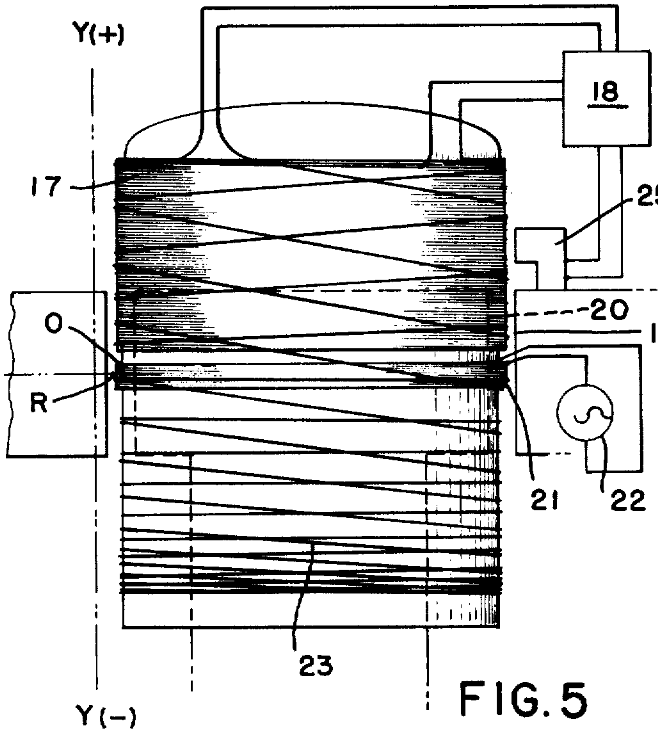

FIG. 5 is an enlarged view of a part of FIG. 1.

For a more detailed description of the drawings, referring to FIG. 1, loudspeaker 10 is shown mounted in sealed enclosure 11 with diaphragm 12 in resilient suspension by outer suspension member 13, inner suspension member 14 and enclosed air 15. Contained on spool 16 are three different sets of two-layer windings, the first being coil 17 which is connected to a continuous direct current source 18. The current direction is made such that as current flows from source 18 through coil 17, the displaceable spool 16 is forced in the downward or Y (−) direction, therefore tending to move more of coil 17 into the magnetic flux between pole faces 19 and 20, thereby tending to increase this Y (−) directed force with movement in the Y (−) direction. Immediately below windings 17 is positioned voice coil 21. Voice coil 21 is located as shown in FIG. 1 for illustrative purposes; however, it may also be wound over or beneath coil 17 and could extend above and below the gap formed by pole faces 19 and 20. Voice coil 21 is driven by alternating voltage source 22 as is well-known in the art. Wound over coil 17 and voice coil 21 and also positioned on spool 16 are windings 23 which carry a direct current, also supplied by direct current source 18. Windings 23 urge the displaceable spool 16 in the upward or Y (+) direction opposite to the force generated by windings 17.

Coil 23 which has two layers is wrapped such that the windings are close together at the bottom or Y (−) end and become progressively less densely wrapped towards the upper end or Y (+) direction of spool 16. The windings of coil 23 are thus wrapped so a progressively greater length of conductor of coil 23 is cut by the magnetic flux between pole faces 19 and 20 as spool 16 moves in the Y (+) direction. In this particular configuration the Y (+) directed force from coil 23 increases as spool 16 moves in the Y (+) direction relative to magnet apparatus 24.

Magnet apparatus 24 generates magnetic flux through which spool 16 is directed as is understood by those skilled in the art, and the flux lines cut the windings 17, 21, and 23 during their travel. It is to be understood that in order to insure proper functioning of the invention, means well-known in the art are to be employed to minimize, to the extent necessary, inhomogeneous flux density of the magnetic field at the top and bottom of the air gap formed by pole faces 19 and 20 of magnet apparatus 24.

Parameters are set for this example such that when the reference point R of the voice coil 21 is at the point O along the Y axis, as shown in FIG. 1, suspension members 13, 14 and 15 exert a net force of zero on spool 16 and energized coils 17 and 23 also exert a combined force of zero on spool 16; the suspension forces exerted are at equilibrium and cause no movement of the displaceable spool 16. When the voice coil 21 is activated spool member 16 initially moves in either the Y (+) or Y (−) direction, moving point R of the voice coil away from the equilibrium point O, and with such displacement outer suspension member 13, enclosed air 15, and inner suspension member 14 exert a combined stiffness force opposing movement of point R away from point O. Coils 17 and 23 would then also cause a net force to be created in the direction of initial movement in the direction opposite to the net force of suspension members 13, 14 and 15. The net force that is generated by windings 17 and 23 directing point R away from point O increases in magnitude as the distance of point R from point O increases. Therefore, the effect of the forces generated by windings 17 and 23 is to reduce the stiffness or opposition to movement exerted by the resilient suspension members 13, 14, and 15.

Also included in FIG. 1 is equilibrium position drift sensing means 25 which monitors relative displacement of spool 16 to determine any movement away from point O of the equilibrium position for point R of voice coil 21. (The equilibrium position is the point at which the forces from members 13, 14, 15, 17, and 23 cancel each other to obtain a net force of zero. For this example, the net force of members 13, 14, and 15 at points away from equilibrium is greater than the net force of members 17 and 23.) Such drift can occur when there is inconstancy in the stiffness of enclosed air 15 within sealed enclosure 11 such as caused by air leakage from the enclosure or significant atmospheric pressure changes, among other factors. In operation, sensor 25 modifies the amperage of current flowing to coils 17 and 23 from the direct current supply 18 when any drift from point O is detected for the equilibrium position of point R. For example, when the equilibrium position shifts in the Y (+) direction from point O, then current is increased in coil 17 or decreased in coil 23 or both as required to provide a correcting force in the Y (−) direction until the desired equilibrium position is reestablished. Proper adjustment of the current in coils 17 and 23 can set the equilibrium position at whatever point is desired. However, when drift occurs, the above method can be used to maintain the equilibrium position at the desired point. Point O is the chosen point for this example as previously mentioned.

The invention as depicted in FIG. 1 can reduce stiffness of a given system, regardless of the type or number of elements contributing to the stiffness encountered. This invention is especially useful in reducing the stiffness caused by a small volume of air in a sealed enclosure in which a loudspeaker is mounted, an example of which is shown in FIG. 1. By reducing the effective stiffness encountered by the speaker diaphragm and thereby lowering the natural resonant frequency for the system, much lower bass frequencies can be reproduced efficiently than is normally possible in such a small speaker system.

In FIG. 1, for coils 17 and 23 the length of conductor which is cut by magnetic flux is dependent on the position of spool 16 with respect to a flux generating means, magnet apparatus 24. That is, spool 16 moves axially in the air gap formed by pole faces 19 and 20, and conductor length of coils 17 and 23 cut by the gap flux varies with this movement. This results in production of a net force on spool 16 which is dependent on the spool's position, a force which increases with spool displacement relative to magnet apparatus 24 in the direction of the force.

Another embodiment of the present invention utilizes a constant length of conductor carrying direct current which is cut by magnetic flux. In this case, the density of magnetic flux which cuts the length of conductor is dependent on the position of spool 16 relative to the magnet apparatus 24.

As an example, spool 16 can be cut by magnetic flux in an air gap having a wedge-shaped cross-section where the flux density increases axially down the gap, as shown in FIG. 2. Here, current source 26 supplies direct current to coil 27 which is cut by the position dependent flux in gap 28. The polarity of the current is as required to produce downward directed force $F_2$ in opposition to force $F_1$, produced by suspension member 29. Force $F_2$ increases with the movement of coil 27 in the direction of force $F_2$. An equilibrium position is established for coil 27 at the displacement where forces $F_2$ and $F_1$ cancel to a net zero force. The stiffness of this combined system is lower than the stiffness of member 29 alone. FIG. 2 illustrates a simple embodiment of the invention demonstrating an electromechanical force element which produces a force which increases with displacement in the direction of the force, combined with an element which produces force in the opposite direction, and establishing an equilibrium position at which these two forces cancel.

As another example of this electromechanical stiffness modifying invention, the coils of FIG. 1 can be replaced by a long singular coil 30 as shown in FIG. 3. In the embodiment of FIG. 3 position sensing means 31 monitors the relative position of coil 30 with respect to magnet apparatus 32 and controls current source 33 to determine the direction and magnitude of current through coil 30, to supply the force needed in either the Y (+) or Y (−) direction at each displacement point to reduce the stiffness encountered due to resilient members 34 and any others, such as those previously described in the embodiment shown in FIG. 1. If stiffness member 34 has a nonlinear force-vs-displacement relationship, this stiffness can be effectively linearized by producing via coil 30 whatever force is necessary at each displacement point. Also, in FIG. 3, coil 30 can carry another component of current (current component herein refers to any partial or whole current conducted) such as that supplied by source 22 to voice coil 21 in FIG. 1. Coil 30, magnet apparatus 32, position sensor 31, and source 33 can further be used as described here (with or without mechanical stiffness members such as 34) to achieve any desired stiffness relationship, positive, or negative, linear or nonlinear, by providing force as required at each displacement point.

Sensing means 25 and 31 are illustrated to demonstrate the accomplishment of their functions and are not meant to indicate precise positioning or structure.

The stiffness reducing effect of the invention, described for the embodiments illustrated by FIGS. 1, 2, and 3 is accomplished by the electromechanical production of negative stiffness forces on positive stiffness members, whereby the stiffness of these positive stiffness members is in effect reduced. (The amount of stiffness reduction which occurs can be easily adjusted by controlling amperage of current in the appropriate conductor lengths.) If, as may be desired for some applications, the net electromechanically produced negative stiffness forces are greater than the net positive stiffness forces of the positive stiffness members, the system will constitute a negative stiffness device. The system will also define a negative stiffness device if there is no positive stiffness member included in the system. A device having zero stiffness will result in the net electromechanically produced negative stiffness forces at each displacement are equal in magnitude but opposite in direction to the net positive stiffness forces applied by positive stiffness members.

Stiffness linearization via this invention has been described above for the system of FIG. 3. This stiffness linearization can also be accomplished in the embodiments illustrated by FIGS. 1 and 2. Referring to FIG. 1, this linearization can be accomplished by properly varying the winding density of coils 17 and 23 along spool 16 so that at each displacement of spool 16 with respect to magnet apparatus 24 the desired linearizing force is produced via coils 17 and 23 and applied to an affixed nonlinear stiffness.

Referring to FIG. 2, if stiffness member 29 is nonlinear, linearization can be accomplished by proper variation of the pole faces which define air gap 28 so that the distance between these pole faces, and consequently the flux density in gap 28, varies along the axial length of gap 28 as required to provide the desired linearizing force in conjunction with the current of coil 27, at each displacement of stiffness member 29.

In the examples shown, current producing means 18, 26, and 33 insure the specified amperage to conductor lengths 17, 23, 27, and 30 and the current in these conductor lengths is not significantly dependent upon the velocity of spool 16, coil 27, or coil 30, respectively. It is to be understood that the permanent magnet apparatus pictured herein can be replaced by an electromagnet apparatus. In some cases it will be desirable to have an electromagnet's energizing coil in series with a conductor length such as coil 17.

FIG. 4 is a sample graph demonstrating the linearizing use of the present invention. In this graph nonlinear postive stiffness curve 35 represents the stiffness for a certain nonlinear system without use of the present invention. The nonlinearity of curve 35 can be reduced by making curve 35 more closely approximating a straight line. Curve 36 represents precise nonlinear negative stiffness produced by an embodiment of the present invention which is matched to the nonlinear stiffness of the given system. Curve 37, the sum of curves 35 and 36, represents linearized reduced stiffness resulting from this nonlinear system due to incorporation of the present linearizing invention. Precise nonlinear positive stiffness from the invention matched to a nonlinear curve 35 could also be used here to produce a linearized stiffness.

It is to be further understood for these specifications and the claims which follow that all statements concerning displacement of some displaceable member refer to relative displacement between a conducting member and a flux generating means such as a magnet structure. All of these statements concerning displacements include the possibilities that either the flux generating means or the conducting member or both are displaced, as long as there is relative displacement of the one with respect to the other. Statements referring to displacement of a conducting member in some direction relative to a flux generating means includes the case in which a flux generating means moves in the opposite direction relative to the conducting member.

As can be determined by those skilled in the art, displacement dependent variations in amperage and current direction, flux density, or length of electrical current carrying conductor cut by magnetic flux, or variations in positioning, number, and configuration of conductor lengths, will provide other embodiments employing the principles set forth herein. The descriptions and drawings disclosed above are merely illustrative and are not intended to limit the scope of this invention.

I claim:

1. An electromechanical apparatus for reducing stiffness comprising: a magnetic flux generating means having a magnetic gap, a current producing means, a group of windings displaceable relative to said flux generating means and cut by magnetic flux of said flux generating means, said group of windings including a first helically wound coil which is densely wrapped at one end and is more loosely wrapped at the opposite end, said first coil conducting an electrical current component for producing in conjunction with said flux generating means an electrodynamic first force in an axial direction on said group of windings which tends to pull the more densely wrapped end of said first coil into said gap, said group of windings including a second coil, said second coil producing a second force acting on said group of windings and directed opposite said first force, said first force increasing with displacement of said group of windings relative to said flux generating means in the direction of said first force, said first force and said second force opposing each other, and including at least one member having stiffness acting on said group of windings whereby the stiffness of said stiffness member is reduced.

2. An electromechanical apparatus for reducing stiffness as claimed in claim 1, wherein said magnetic flux generating means generates a magnetic flux which has variable density.

3. An electromechanical apparatus for reducing stiffness as claimed in claim 1, wherein the length of said group of windings cut by magnetic flux varies according to the position of said group of windings relative to said flux generating means.

4. An electromechanical apparatus for reducing stiffness as claimed in claim 1 and including a voice coil.

5. An electromechanical apparatus for reducing stiffness as claimed in claim 1, and including equilibrium position stabilizing means.

6. An electromechanical apparatus for reducing stiffness as claimed in claim 1, wherein said electrical current component is a direct current component of constant amperage.

7. An electromechanical apparatus for reducing stiffness as claimed in claim 1, wherein said electrical current component's amperage is dependent upon the position of said conducting member relative to said flux generating means.

8. A loudspeaker of the moving coil type mounted in a sealed enclosure comprising: first and second groups of electrical windings suspended in a magnetic gap, said windings being fixed relative to each other and being axially displaceable, said first group of windings including a helically wound coil which is densely wrapped at one end and is more loosely wrapped at the opposite end, said windings being affixed to a diaphragm member, a volume of air within the enclosure exhibiting stiffness properties on said diaphragm member, said first group of windings carrying electrical currents to produce a force in an opposite axial direction from a second force produced by said second group of windings whereby the force produced by said first and second group of windings reduces the stiffness of the enclosed air acting on said diaphragm member.

9. An electromechanical apparatus for linearizing stiffness comprising: a magnetic flux generating means, a current producing means, a group of windings displaceable relative to said flux generating means and cut by magnetic flux of said flux generating means, said group of windings including a helically wound coil which is densely wrapped at one end and is more loosely wrapped at the opposite end, said coil conducting an electrical current component for producing in conjunction with said flux generating means an electrodynamic first force in an axial direction on said group of windings, a second force producing means which produces a second force acting on said group of windings directed opposite to said first force, said first force increasing non-linearly with the displacement of said group of windings relative to said flux generating means in the direction of said first force, said first force and said second force opposing each other and at least one member having non-linear stiffness acting on said group of windings whereby force is exerted on said non-linear stiffness member dependent on the displacement of said group of windings relative to said flux generating means to reduce the non-linearity of said stiffness member.

10. An electromechanical apparatus for linearizing stiffness as claimed in claim 9 and including a voice coil.

11. An electromechanical apparatus for reducing stiffness comprising: a magnetic flux generating means having a magnetic gap, a current producing means, a group of windings displaceable relative to said flux generating means and suspended in said magnetic gap, said group of windings including a first coil, said first coil having two ends, one of said ends remaining in said magnetic gap and the other end remaining outside of said gap during displacement of said windings, said first coil having a direct current component for producing in conjunction with said flux generating means an electrodynamic first force in an axial direction on said group of windings tending to pull said first coil further into said gap, said group of windings including a second coil, said second coil producing a second force acting on said group of windings and directed opposite the first force, said first force increasing with displacement of said group of windings relative to said flux generating means in the direction of said first force and including at least one member having stiffness acting on said group of windings whereby the stiffness of said stiffness member is reduced.

12. An electromechanical apparatus for reducing stiffness as claimed in claim 11 and including a voice coil.

13. An electromechanical apparatus for reducing stiffness comprising: a magnetic flux generating means having a magnetic gap, a current producing means, a helically wound coil which is densely wrapped at one end and is more loosely wrapped at the opposite end, said coil being displaceable relative to said flux generating means and cut by magnetic flux of said flux generating means, said coil carrying a direct current component producing in conjunction with said flux generating means an electrodynamic first force in an axial direction on said coil which tends to pull the more densely wrapped end of said coil into said gap, a force producing means which produces a second force acting on said helically wound coil and directed opposite said first force, said first force increasing with displacement of said coil relative to said flux generating means in the direction of said first force, said first force and said second force opposing each other including at least one member having stiffness acting on said coil, whereby the stiffness of said stiffness member is reduced.

14. An electromechanical apparatus for reducing stiffness as claimed in claim 13 and including a voice coil.

15. An electromechanical apparatus for reducing stiffness comprising: a magnetic flux generating means having a magnetic gap, a current producing means, a coil displaceable relative to said flux generating means and suspended in said magnetic gap, said coil having two ends, one of said ends remaining in said magnetic gap and the other of said ends remaining outside of said gap during displacement of said coil relative to said gap, said coil conducting a direct current component for producing in conjunction with said flux generating means an electrodynamic first force in an axial direction on said coil tending to pull windings of said coil into said gap, a force producing means which produces a second force acting on said coil and directed opposite said first force, said first force increasing with displacement of said coil relative to said flux generating means in the direction of said first force, said first force and said second force opposing each other including at least one member having stiffness acting on said coil whereby the stiffness of said stiffness member is reduced.

16. An electromechanical apparatus for reducing stiffness as claimed in claim 15 and including a voice coil.

17. An electromechanical apparatus for reducing stiffness comprising: a magnetic flux generating means, a pair of opposing ends of said flux generating means, said ends spaced from each other and forming a gap having a substantially wedge-shaped cross section with wide and narrow portions, a current producing means, a coil displaceable relative to said flux generating means and suspended in said magnetic gap, said coil having two ends, at least one of said coil ends remaining in said magnetic gap during displacement of said coil relative to said gap, said coil conducting a direct current component for producing in conjunction with said flux generating means an electrodynamic first force in an axial direction on said coil which tends to pull windings of said coil into the narrow portion of said gap, said first force increasing with the displacement of said coil relative to said gap in the direction of said first force, a force producing means producing a second force acting on said coil and directed opposite said first force, said first force and said second force opposing each other including at least one member having stiffness acting on said coil, whereby the stiffness of said stiffness member is reduced.

* * * * *